(12) United States Patent
Spence

(10) Patent No.: US 6,436,884 B1
(45) Date of Patent: Aug. 20, 2002

(54) POLLUTION REMEDIAL COMPOSITION AND METHOD

(76) Inventor: William B. Spence, 623 W. Waldheim Rd., Pittsburgh, PA (US) 15215

( * ) Notice: Subject to any disclaimer, the term of this patent is extended or adjusted under 35 U.S.C. 154(b) by 0 days.

(21) Appl. No.: 09/534,709

(22) Filed: Mar. 24, 2000

Related U.S. Application Data

(60) Provisional application No. 60/126,160, filed on Mar. 25, 1999.
(51) Int. Cl.$^7$ ............................. C11D 3/00; C11D 17/00; C11D 17/08; A62D 3/00; C04B 12/04
(52) U.S. Cl. ......................... 510/110; 510/421; 106/634
(58) Field of Search ................................. 510/110, 421; 106/634

(56) References Cited

U.S. PATENT DOCUMENTS 5,478,389 A    12/1995    Loomis

*Primary Examiner*—Yogendra N. Gupta
*Assistant Examiner*—John M Petruncio
(74) *Attorney, Agent, or Firm*—Buchanan Ingersoll, P.C.

(57) ABSTRACT

A pollution remedial composition primarily for treating polychlorinated biphenyl compounds is disclosed. The pollution remedial composition includes from about 35 to about 40 volume % of a soluble silicate; from about 0.25 to about 2 volume % of a surfactant; from about 2 to about 5 volume % of a polyol; and the remainder water. The soluble silicate is preferably sodium silicate. The surfactant is preferably Tergitol brand surfactant. The polyol is preferably polyethylene glycol.

5 Claims, No Drawings

POLLUTION REMEDIAL COMPOSITION AND METHOD

This application claims priority from provisional application No. 60/126,160, filed Mar. 25, 1999.

BACKGROUND OF THE INVENTION

1. Field of the Invention

This invention relates to a pollution remedial composition and a method of using the pollution remedial composition. More particularly, this invention relates to an improved composition for remediating polychlorinated biphenyls ("PCB").

2. Description of the Prior Art

PCB pollutants comprise one of the most significant hazardous waste problems we face today. The PCB pollutants are man-made, can be found in soil and in water, and have relatively long half-lives. PCB compounds have been widely used as insulation in electrical equipment, such as transformers and capacitors. If an electrical equipment contains PCB compounds, the equipment, its support platform, and the soil under and around the area most likely will contain these pollutants. PCB compounds are, to a certain extent, fire resistant. When they are burned, however, some toxic dioxin is formed as a by-product of the combustion, along with phosgene and hydrochloric acid. PCB compounds biodegrade very slowly and their very low vapor pressure precludes their loss to the atmosphere. Thus, cleanup of PCB compounds is particularly expensive especially since incineration, the normal method of decontamination, is unacceptable.

U.S. Pat. No. 5,478,389 to Loomis discloses a pollution remediation composition. The composition disclosed by Loomis includes from 40 to 75 volume % of a soluble silicate (preferably sodium silicate), from about 0.25 to 5 volume % surfactant (preferably an ester of organophosphoric acid), from 1 to 5 volume % of a polyol (preferably ethylene glycol), and the remainder water. It has been found that the composition disclosed by Loomis, while capable of greatly reducing the level of PCB compounds, is not able to fully remediate a contaminated waste site to currently mandated levels of less than 10 ppb for residential use, less than 100 ppb for industrial use, and less than 2 ppm for soils.

Accordingly there is a need for an improved composition capable of reducing PCB levels to such approved levels.

SUMMARY OF THE INVENTION

A pollution remedial composition primarily for treating polychlorinated biphenyl compounds is disclosed. The pollution remedial composition includes from about 35 to about 40 volume % of an alkali metal, preferably a soluble silicate; from about 0.25 to about 2 volume % of a surfactant; from about 2 to about 5 volume % of a polyol; and the remainder water. The soluble silicate is preferably sodium silicate. The surfactant is preferably Tergitol brand surfactant, a NP-9.5 surfactant sold by Union Carbide. The polyol is preferably polyethylene glycol. The composition may include other constituents as necessary for added benefits.

The present composition is capable of destroying PCB compounds at ambient temperatures for soils and material surfaces (i.e., concrete or brick). The composition is used in an alkali metal catalyzed dechlorination method. Dechlorination of PCB compounds is completed through a series of chemical reactions; ultimately through a reduction reaction.

Chlorinated hydrocarbon-contaminated soils can be dehalogenated by dispersion and catalysts. The presence of a catalyst allows the reduction reactions to proceed at low temperature. Critical factors are surface area, moisture content and pH. In the case of contaminated soil, the catalysts, dispersant, buffering agent, and reductive chemical must enter the intractable matrices (blind pore spaces) simultaneously, thus, maximizing surface area and pH, resulting in complete reduction of the chlorinated compound (s). Because this reduction reaction proceeds at ambient temperature, complex dehalogenation may require an extended period of time up to 24 hours.

The initial chlorinated hydrocarbon concentrations in the soils and the degree of dechlorination desired determine the quantity and composition of the reagents. Theoretically, only stoichiometric quantities (that is, one or two moles dehalogenating reagent for every mole of organic chlorine) are required. In practice, however, some multiple of the stoichiometric quantities will be necessary to allow for reagent dilution with interstitial or bound moisture in certain soils, for example clays. A biodegradable organic mobilizing or compatible surfactant (1–15%) is added when treating highly intractable matrices.

Identified by-products include biphenyl, non-chlorinated biodegradable hydrocarbons and common salts, such as sodium chloride, potassium chloride and calcium chloride. No PCB compounds or volatile organic compounds were found in off gases collected during the treatability studies.

The present composition can be used through a spray application on soils, concrete surfaces and/or sludges. Surface contact is the key to high levels of PCB destruction (greater than 95 percent destruction). At times, hydrogen peroxide can be used to disrupt soil aggregates and decompose organic matter to help penetration of the present composition. Soil moisture affects destruction efficiency by preventing the present composition, which is a water soluble liquid, from permeating soil pore spaces.

Two basic methods can be used to apply the present composition; (1) in situ or (2) excavation and processing. The in situ method is the in-place preparation of surface soils by tilling and/or discing to a depth of about 18 inches and then injection of the present composition through spray nozzles to the desired depth. Generally, one application is required. More than one application is anticipated when surfaces or soils contain high concentrations of PCB compounds.

The excavation and processing method can consist of two procedures. For one procedure, excavated soils are sprayed with the present composition and placed in a lined treatment bed or returned to the excavated trench. For compacted or clay-rich soils, a shredder modified with spray nozzles can be used.

Because it is a contact process, the present process works efficiently in the destruction of PCB compounds on concrete and steel surfaces. In one field remediation at a steel finishing facility more than 90% destruction of PCB compounds was observed from a concrete floor. This preliminary test was to be used to plan a remediation of the building floor. No preparation of the floor was conducted prior to treatment. However, with preparation, higher treatment efficiency is expected.

Other examples of treatment efficiency are:
  Soil treatment—Clayey fine sandy loams were treated with the present composition with destruction of PCB compounds ranging from 82% to about 90%.
  Soil treatment—Treatment with the present composition reduced the PCB compounds by more than 92% to 96%.

Soil treatment—More than 95% destruction was accomplished with the present composition in a silt loam soil.

In addition, all treatability studies on contaminated materials completed under USEPA protocols resulted in PCB compound reduction of 92% to more than 98%.

In all site cases high levels of total petroleum hydrocarbons were present. As part of the chemical reactions, the concentration of total petroleum hydrocarbons was also reduced by about 30%.

DETAILED DISCUSSION OF THE PREFERRED EMBODIMENTS

Polychlorinated Biphenyls represent one of the more toxic and persistent contaminants found in the environment today. Since first being regulated under the Toxic Substances Control Act (TSCA) in 1978, billions of dollars have been spent by industry and government managing PCB problems. A significant portion of the dollars spent have been used to dispose of PCB-containing substances.

Based upon their widespread use in the past, PCB compounds are routinely detected in a variety of media, thus representing one of the more challenging and expensive remediation obstacles facing owners and/or developers of industrial properties. Traditional methods to remediate PCB compounds have proven ineffective, expensive and in many cases, merely transfer liability from one media to another. Meeting the strict clean-up criteria mandated by governmental agencies may also pose a considerable challenge to several of the more common methods, unless considerable time and repeated applications (i.e. more money) are used to achieve remediation goals. Many of the more common PCB treatment methods include not only the cost of the treatment, but other hidden expenses as well, increasing the overall cost of the remediation effort. In addition, the liability associated with transferring the contaminant from one form to another, or the potential long term liability associated with leaving the contaminant in place (encapsulation), are also considerations which must be evaluated when choosing a PCB remediation technique.

The present method is a chemical contact process, which upon completion of the reaction, leaves only non-toxic residues as by-products; the process destroys the PCB compound. As such, use of the process minimizes the amount of the site preparation necessary, eliminates the need for costly disposal, and eliminates the long term liability associated with more traditional methods. The method can be applied to a variety of media and has been successfully field scale tested in soils and on concrete surfaces.

Broadly, the pollution remedial composition of the present invention contains more than 35 volume % but less than 40 volume % of a soluble silicate; from about 0.25 to about 5 volume % of a surfactant; from about 1 to about 5 volume % of a polyol; and the remainder water.

Preferably, the following composition is representative of the present invention.

| Component | Weight | Volume | Vol. % |
|---|---|---|---|
| Sodium Silicate | 744.6 g | 19.25 gal. | 38.5% |
| Polyethylene Glycol | 6.21 g | 0.25 gal. | 0.5% |
| Tergitol (surfactant) | 62.05 g | 2 gal. | 4.0% |
| Water | 428.14 g | 28.5 gal. | 57.0% |

This pollution remedial composition is stable and effectively decontaminates pollutants from a soil sample or from water having pollutants floating thereon. The pollution remedial composition can also be used to de-grease a driveway or a human body surface. Further, the pollution remedial composition is effective in putting out fire. Moreover, the pollution remedial composition can be used, in a closed system, to recover mercury from a sludge.

The present process is a successful, new dechlorination technology which destroys PCB compounds at ambient temperatures for soils and concrete surfaces. The present process dechlorinates the PCB compounds through a series of chemical reactions which take less than 12 hours to complete. Treatability studies are used to determine the correct field application procedure required and prepare the proper ratios of chemicals, based upon the concentration of PCB compounds present in the soil or surface. One application of the chemical mixture is generally required. The present process is an on-site treatment technology which can be used on a wide range of soil types and surfaces.

The present composition strips the chlorine atoms from the ring structures of the polychlorinated biphenyl compounds. Catalysts allow the chemical reactions to proceed at low temperature. Critical factors controlling the reactions in soils, as well as on surfaces, include the initial PCB concentration, surface area, pH and temperature. Additional factors affecting treatment efficiency in soil include porosity, permeability, soil moisture content, total organic content and bulk density. The initial chlorinate hydrocarbon concentration of the soil, and degree of dechlorination desired, determine the quantity and composition of the present composition. A biodegradable organic mobilizing solvent, also can be added when treating highly intractable matrices.

Treatment efficiencies typically range from 92% to 99.9% destruction of PCB compounds. Sites vary from substations to isolated machinery and transformer sites. At one recent power substation, concentrations up to 500,000 $\mu g/100$ cm$^2$ PCB compounds on floor surfaces were reduced to less than 10 $\mu g/100$ cm$^2$. Soils can be treated with the same effect.

Two basic methods can be used to apply the present composition to soils, in situ or by excavation and processing. The in situ method is the in-place preparation of surface soils by tilling and/or discing to a depth of about 18 inches, followed by the injection of a chemical mixture through spray nozzles to the desired depth. Generally, one application is required. In addition, treatment cells can be constructed for small quantities of soil (less than 10 tons).

The excavation and processing method can consist of two procedures. For one procedure, excavated soils are sprayed with the present composition and placed in a lined treatment bed, or returned to the excavated trench. For compacted or clay-rich soils, a shredder modified with spray nozzles can be used.

Information required for site preparation includes:

1. Soil temperature (field measured)
2. Moisture content (field measured)
3. Sieve analysis (particle size) (field measured)
4. Soil classification (field measured)
5. Initial concentration of PCB compounds and Total Petroleum Hydrocarbons (laboratory tests)

Because no major equipment is necessary for the commercial application process, there are generally no critical operating parameters, other than the application rate and initial concentration/composition to be used.

In summary, the steps of the present treatment process are as follows:

1. Soil characterization
2. Treatability analysis
3. Selection of chemical mixture and catalyst
4. Spray application
5. Post-remediation sampling

EXAMPLES

The following examples are provided to illustrate the effectiveness of the present process.

Example 1

The present process was used at a former Substation to treat concrete flooring within the first floor of the building. This area was formerly used to house typical substation electrical components such as transformers, switch gearing, relays and voltage regulators. Initial sampling completed in several stained areas indicated pre-treatment PCB concentrations ranging from approximately 12 to 1,200 $\mu g/100$ $cm^2$. Additional pre-sampling completed by the utility after vandalism of the building, indicated that PCB concentrations up to 500,000 $\mu g/100$ $^2$ could be expected.

The present composition was applied to an area of approximately 4,700 $ft^2$. The on-site treatment process was completed in one day. The following day, 10 post-treatment wipe samples were collected. Six of the 10 samples did not detect PCBs at a detection limited of 0.30 $\mu g/100$ $cm^2$. The remaining four samples had concentrations ranging from 0.5 to 5 $\mu g/100$ $cm^2$, also with detection limits of 0.30 $\mu g/100$ $cm^2$. As such the process proved highly effective in achieving the in-house clean-up criterion of 10 $\mu g/100$ $cm^2$.

Example 2

The present composition was used at an active Substation to treat soils contaminated with PCB compounds within one of the main transformer banks scheduled to undergo refurbishment. Miscellaneous leaks had occurred within the transformer bank over time. Soils encountered within the 144 ft. by 26 ft. area consisted largely of surficial quarry screenings (1–2 inches) underlain by fill which can best be described as fine sand and silt, with 20–30 percent coarse fragments.

Initial soil sampling completed within the area to be treated ranged from approximately 1 to 16,000 $\mu g/kg$. PCB concentrations up to 500,000 $\mu g/kg$ were expected in parts of the treatment area. The present composition was applied to the soils in-situ. The solution was applied directly to the affected area followed by mechanical mixing to a depth of 12 inches.

After one application, approximately 70 percent of the site was below the clean-up criterion established for the site. A second application is currently being planned.

Example 3

Two separate concrete areas inside a large building (900,000 square feet) were treated by the present process. In one area, initial concentrations were in the range of 5 to 25,000 $\mu g/100$ $cm^2$. After application, the concentration of PCB compounds were less than 35 $\mu g/100$ $cm^2$; a second treatment resulted in PCB concentrations less than 15 $\mu g/100$ $cm^2$. In the other treatment area, concentrations of PCB compounds were reduced from several thousand $\mu g/100$ $cm^2$ to less than 10 $\mu g/100$ $cm^2$.

Example 4

The present method was used to remediate concrete flooring surfaces contaminated with PCBs at a former Superfund site. The building was formerly used for manufacturing and warehouse operations. The present remediation technique was attractive to site owners based upon the fact that the existing concrete surfaces would not have to be removed or encapsulated, allowing reuse of the flooring for new construction. Starting PCB concentrations were reportedly more than 100 $\mu g/100$ $cm^2$. The method proved highly successful in treating the surface to well below the cleanup objective established for the site (10 $\mu g/100$ $cm^2$). Based upon the success of the technique, additional flooring surfaces of more than 178,000 $ft^2$ have been identified for remediation in 1998.

The invention now being fully described, it will be apparent to one of ordinary skill in the art that many changes and modifications can be made thereto without departing from the spirit or scope of the invention as defined in the following claims.

What is claimed is:

1. A pollution remedial composition comprising: more than 35 volume % but less than 40 volume % of a soluble silicate; from about 0.25 to about 2 volume % of a surfactant; from about 2 to about 5 volume % of a polyol; and the remainder water.

2. The pollution remedial composition of claim 1 wherein said soluble silicate is sodium silicate.

3. The pollution remedial composition of claim 1 wherein said surfactant is an ethoxylated nonylphenol containing an average of 9.5 ethyleneoxy units per molecule.

4. The pollution remedial composition of claim 1 wherein said polyol is plyethylene glycol.

5. A method for remediating a waste site contaminated by polychlorinated biphenyl compounds comprising the steps of:

a.) Characterizing the soil to be treated;

b.) Analyzing available treatability techniques; and c.) Selecting the appropriate chemical mixture and catalyst, said chemical mixture being a composition comprising a pollution remedial composition comprising: more than 35 volume % but less than 40 volume % of a soluble silicate; from about 0.25 to about 2 volume % of a surfactant; from about 2 to about 5 volume % of a polyol; and the remainder water;

d.) Applying said chemical mixture and catalyst to said waste site by spray application; and e.) Sampling the waste site after treatment.

\* \* \* \* \*